United States Patent [19]

Kowanz

[11] Patent Number: 5,779,218
[45] Date of Patent: Jul. 14, 1998

[54] VALVE WITH PIEZOELECTRIC LAMINA AND A METHOD OF PRODUCING A VALVE

[75] Inventor: Bernd Kowanz, Öhringen, Germany

[73] Assignee: Burkert Werke GmbH & Co., Germany

[21] Appl. No.: 817,828

[22] PCT Filed: Sep. 6, 1996

[86] PCT No.: PCT/EP96/03920

§ 371 Date: May 7, 1997

§ 102(e) Date: May 7, 1997

[87] PCT Pub. No.: WO97/09555

PCT Pub. Date: Mar. 13, 1997

[30] Foreign Application Priority Data

Sep. 8, 1995 [DE] Germany .................. 295 14 495.5

[51] Int. Cl.$^6$ .................................................. F16K 31/02
[52] U.S. Cl. ................................................... 251/129.06
[58] Field of Search ................... 251/129.06, 363, 251/129.01

[56] References Cited

U.S. PATENT DOCUMENTS

| | | | |
|---|---|---|---|
| 3,044,743 | 7/1962 | Siegel | 251/363 X |
| 4,567,394 | 1/1986 | Frisch . | |
| 4,617,952 | 10/1986 | Fujiwara et al. | 251/129.06 X |

FOREIGN PATENT DOCUMENTS

| | | |
|---|---|---|
| 0 128 447 A2 | 12/1984 | European Pat. Off. . |
| 0 170 990 A1 | 2/1986 | European Pat. Off. . |
| 0 538 236 A1 | 4/1993 | European Pat. Off. . |
| 0 565 510 A2 | 10/1993 | European Pat. Off. . |
| 3 400 645 A1 | 7/1984 | Germany . |
| 0189374 | 8/1986 | Japan ............. 251/129.06 |
| 0246667 | 10/1987 | Japan ............. 251/129.06 |
| WO 95/00786 A1 | 1/1993 | WIPO . |

*Primary Examiner*—Kevin Lee
*Attorney, Agent, or Firm*—Sixbey, Friedman, Leedom & Ferguson, P.C.; Gerald J. Ferguson, Jr.; Tim L. Brackett, Jr.

[57] ABSTRACT

A valve having a housing (1) and at least one sealing seat (2, 3) formed therein and one piezoelectric lamina (6) self-supportingly mounted at its first end on the housing (1) and with its second end closing or opening the sealing seat (2, 3) depending on the control voltage supplied to the lamina (6). The first end of the lamina (6) is embedded in a sealing compound (7) which, in turn is at least partially incorporated in the housing (1). The lamina (6) is thereby rigidly connected to the housing (1). While the first end of the lamina (6) is being sealed, it is fixedly held in relation to the housing (1). Consequently, the lamina (6) cannot be displaced even during a long period of operation. Subsequent adjustment is therefore unnecessary.

6 Claims, 3 Drawing Sheets

VALVE WITH PIEZOELECTRIC LAMINA AND A METHOD OF PRODUCING A VALVE

TECHNICAL FIELD

The invention relates to a valve having a housing and at least one sealing seat formed therein and one piezoelectric lamina self-supportingly mounted at its first end on the housing and with its second end closing or opening the sealing seat depending on the control voltage supplied to the lamina.

The invention further relates to a method of producing a valve having a housing and at least one sealing seat formed therein and one piezoelectric lamina self-supportingly mounted at its first end on the housing and with its second end closing or opening the sealing seat depending on the control voltage supplied to the lamina.

BACKGROUND OF THE INVENTION

A generic valve and a generic method are known from the DE 34 00 645 C2. In the case of the control valve disclosed therein the first end of the lamina is gripped and clamped between two halves of the housing and presses in the rest state with the second end on one of two opposite valve seats. Since the position of the second end of the lamina is not exactly determined and is dependent on the tolerance-induced variations of the dimensions of the parts contributing to the clamping of the first end, the sealing seats have to be exactly adjusted subsequent to the clamping of the first end. If, after a period of time the mechanical bias of the lamina changes due to the mechanical relaxation in its mounting, then the previously adjusted parameters drift, so that a subsequent adjustment is necessary.

The EP 0 565 510 A2 shows a further valve with a piezoelectric lamina. In this known valve the gripped end of the piezoelectric lamina is pressed against three support bearings by means of a control spring. The other free end of the lamina contacts a sealing seat with a mechanical bias so as to close it. If an electrical voltage is supplied to the piezoelectric lamina, then the latter is deflected, lifted off its sealing seat and pushed against a second opposite sealing seat so as to close it. In the case of shutting off or reversing the electrical voltage, the lamina moves back in its initial position. Thus, the piezoelectric lamina directly acts as lock body, alternatingly sealing at the one or the other sealing seat. In order to function this way, the lamina has to be exactly adjusted and fixed in the housing. Both the sealing seats and also at least one of the three support bearings are adjustable for this purpose. This valve, too, has to be subsequently adjusted after a period of operation.

SUMMARY OF THE INVENTION

The invention provides a valve with piezoelectric lamina which does not require any complicated adjustment and any subsequent adjustment after a period of operation. According to the invention the lamina is embedded into a sealing compound which is at least partially incorporated in the housing and rigidly connects the lamina to the housing. Due to the lamina not being clamped in the housing but being fixed therein by means of a sealing compound, the mechanical load of the lamina is reduced. Consequently, settling actions in the region of the mounting of the first end cannot occur, thus making a subsequent adjustment superfluous. The lamina can be sealed with the aid of a mold, separately put on and removable again following the solidification of the sealing compound. Thereby it has to be ensured that the sealing material filling the mold, even if it is to protrude in the solidified state with respect to the housing, it is also at least partially incorporated in the housing in order to interlockingly connect the solidified sealing material with the housing, thereby, in turn, achieving a rigid form-fit connection of the lamina with the housing. In the preferred embodiment, however, a separate mold for the pour of a sealing compound is not used, but the first end of the lamina projects into a hollow of the housing and is anchored therein by the sealing compound filling the hollow.

Depending on which initial state the lamina is to have with no control voltage applied, the lamina may either not contact the sealing seat or contact it with a mechanical bias. The defined mechanical bias is selected so as to achieve the desired locking pressure at the sealing seat.

In the preferred embodiment the sealing seat is formed on a small tube displaceably inserted in a bore of the housing and subsequent to the adjustment attached thereon. This embodiment enables at the beginning the positioning of the lamina in the housing without a bias and the sealing of its first end in order to adjust a defined bias with which the lamina is in contact with the sealing seat. Subsequently, exercising a predetermined biasing force an axially displaceable sealing seat is pressed against the second end of the lamina while at the latter a defined electrical voltage is being applied resulting in a controlled bend against the sealing seat. In this state the sealing seat can then be rigidly fixed to the housing. It is further possible to mechanically load and to bend the lamina, i.e. by means of placing a weight on it after the insertion into the housing and prior to its anchoring. The sealing compound is then incorporated in this bent state. The mechanical load is removed only after the solidification of the sealing compound.

Alternatively or additionally, an electrical voltage is supplied to the piezoelectric lamina subsequent to its insertion in the housing effecting a defined deflection or bending. In this state the lamina is anchored in the housing. Since in these embodiments it is no longer mandatory to adjust the sealing seat, it is possible to connect the sealing seat non-adjustably with the housing, for example integrally.

The method of producing a valve seat in accordance with the invention correspondingly provides that the first end of the lamina is rigidly connected to the housing by means of a pour of a sealing compound, whereby the lamina is fixedly held in relation to the housing while being sealed. Thereby, the lamina can, for example, be positioned and held in its initial state without an applied control voltage which it assumes following the solidification of the sealing compound. Furthermore, as already described above it is possible to seal the first end of the lamina after having supplied an electrical voltage to the latter.

Again another method of applying a defined mechanical bias at the lamina is to position its first end in the housing at first without a bias, then to rigidly connect this first end with the housing by a pour of a sealing compound and to abut the axially displaceable sealing seat under a predetermined biasing force against the other end of the lamina or to have the sealing seat displaced by the lamina under a predetermined counter force. Finally, the sealing seat moved in its final position is rigidly fixed to the housing.

Further features and advantages of the invention will be apparent from the following description and the attached drawings to which reference is made, in which

DETAILED DESCRIPTION OF THE INVENTION

Figure 1:
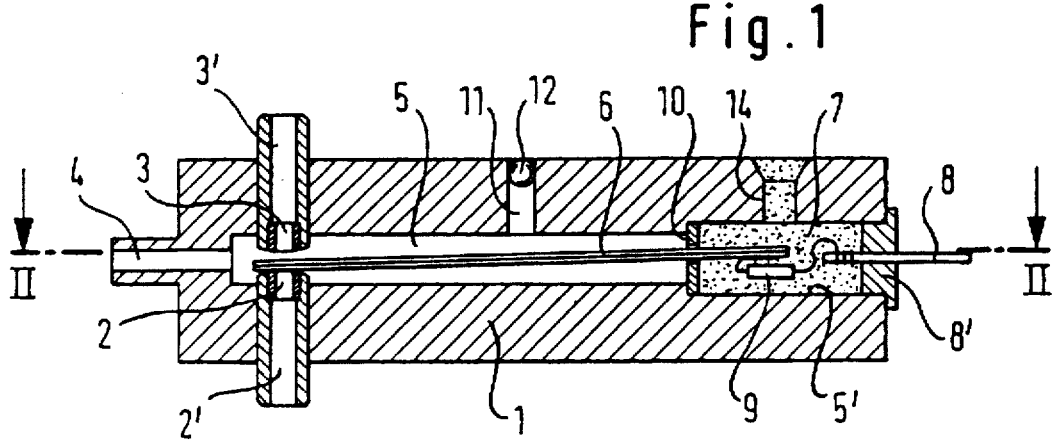
FIG. 1 is a diagrammatic longitudinal section of a valve with piezoelectric lamina.
Figure 2:
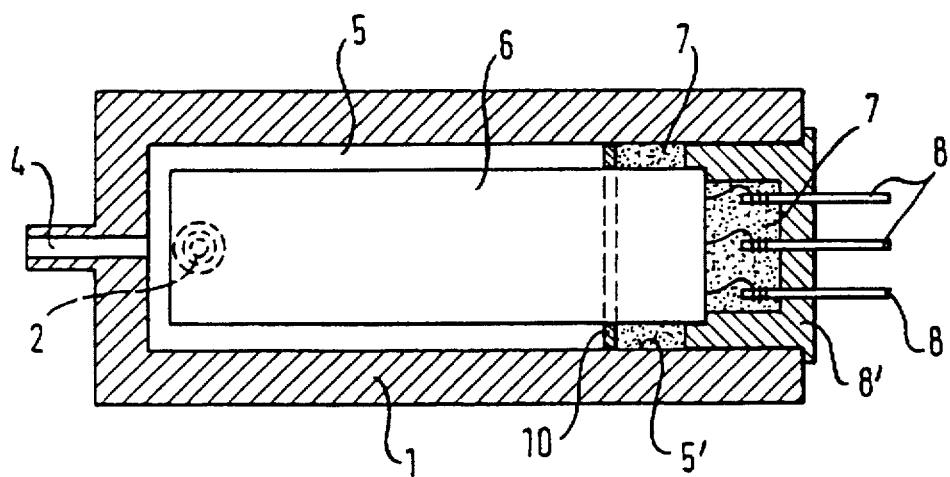
FIG. 2 shows a section along the II—II line in FIG. 1.

In the embodiments shown in FIGS. 1 and 2, the valve consists of a housing 1 cuboidal in shape in which an air inlet seat 2 and an air outlet seat 3 are non-adjustably, fixedly incorporated. The air inlet seat 2 and the air outlet seat 3 are configured as inserts made of elastomer to achieve a better sealing and are attached to an air inlet connection 2' or air outlet connection 3'. The interior space 5 of the housing 1 is in connection with a signal output 4. A piezoelectric lamina 6, lies, on the one hand, on the air inlet seat 2 with a determined mechanical bias and is, on the other hand, fixed in the housing 1 by means of a sealing compound 7.

The piezoelectric lamina 6 is connected to contact pins 8 by connection lines and by an optional protective resistor 9. These connection lines, the protective resistor 9 and the contact pins 8 are also embedded and fixed in the sealing compound 7.

The housing 1 has at its end remote from the signal output 4 a hollow 5' opening at the outer periphery in which the sealing compound 7 is poured in. This hollow 5' is closed in the direction of the signal output 4 by a partition plate 10; the hollow (5') is closed on the opposite side by a base 8' having contact pins 8.

Figure 3:
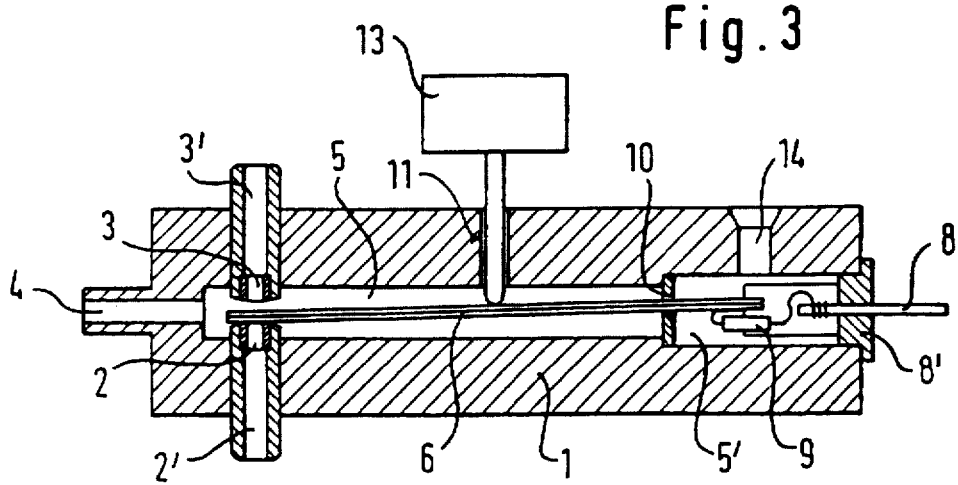
FIG. 3 represents a sectional view depicting the valve in the phase of applying the defined mechanical bias to the lamina.

For assembling the valve, first from the piezoelectric lamina 6 a subassembly is formed including the partition plate 10 provided with a leadthrough slot for the lamina, the connection lines, the protective resistor 9 and the base 8' with the contact pins 8. The subassembly is then being inserted through the hollow into the housing 1. The piezoelectric lamina 6 is thereby to begin with loosely held in the predetermined position by the partition plate 10 and the base 8' provided with slots to receive the end of the lamina. The housing 1 is provided with an auxiliary assembly bore 11 approximately in the center above the lamina 6. Through this auxiliary assembly bore 11, as shown in FIG. 3, a pin loaded with a weight 13 is inserted which lies on the lamina 6 and exercises a defined bias on the latter. Consequently, the free end of the lamina 6 is now supported with a defined mechanical bias by the air inlet seat 2 and the partition plate 10 whereby it is slightly bent. The sealed first end of the lamina 6 is thereby not loaded.

The hollow designated with 5' in FIG. 3 is now completely filled through a gate channel 14 provided in the housing 1 with a fluid sealing compound 7, in particular with casting resin, whereby the gate channel 14 is also being filled with the sealing compound 7. Following the solidification of the sealing compound 7, the lamina 6 is fixed in its position. Subsequently, the weight 13 is removed. The auxiliary assembly bore 11 is closed in a pressure-sealed manner by means of a ball 12. Now the valve is ready for operation.

The described construction of the valve has the advantage of being able to determine the mechanical bias of the piezoelectric lamina 6 by the weight 13 with a high degree of accuracy. Dimensional tolerances at the housing 1, at the sealing seats 2, 3, the partition plate 10 and at the lamina 6 itself, as well as form defects of this lamina 6 have hardly any influence on the defined bias of the lamina 6 making an adjustment superfluous.

Figure 4:
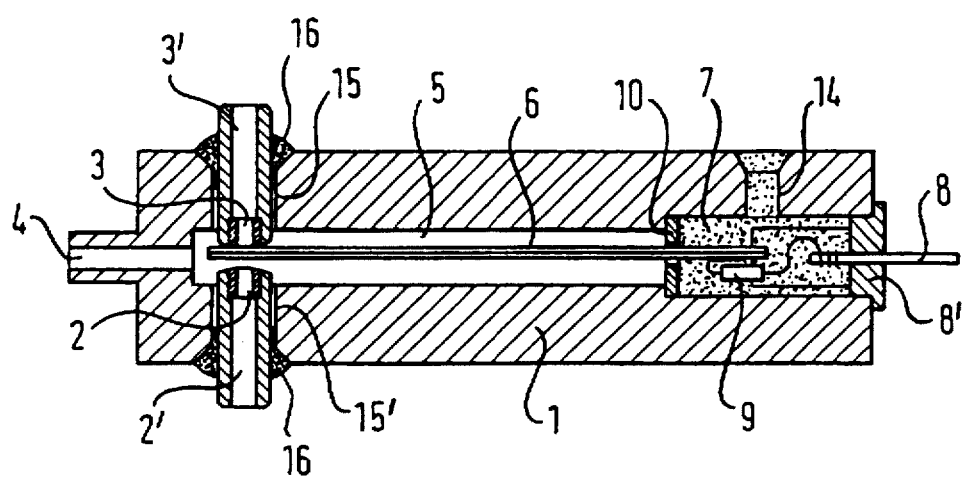
FIG. 4 illustrates a second embodiment of the valve.

In the embodiment shown in FIG. 4 the lamina 6 preassembled with the protective resistor 9 and the base 8' is again at first positioned in the housing by means of the partition plate 10. The hollow 5' of the housing 1 is then filled with the sealing compound 7. Following the solidification of the sealing compound, the lamina 6 is fixed in the housing 1 in a pressure-sealed manner. The air inlet connection 3' with the air inlet seat 3 is now loosely placed into the housing by means of an assembly bore 15 and lies on the lamina 6 with its own weight. The exact position of the air inlet seat 3 can now be determined by supplying an electrical voltage to the lamina 6, preferably that voltage with which the air inlet seat 3 is to be opened during later operation. Subsequently, the air inlet seat 3 is being fixed by an adhesive 16 in the desired position. The assembly of the air outlet seat 2 is accomplished the same way, namely by a further assembly bore 15' of the housing 1, whereby the piezoelectric lamina 6 is supplied with that electrical voltage which is provided to close the air outlet seat 2 during later operation. Following the solidification of the adhesive, the valve is ready for operation. In the case of this embodiment the operating voltages with which the air inlet seat 3 is opened or the air outlet seat 2 is closed may be predetermined with a high degree of accuracy without requiring a subsequent adjustment of the valve seats. Dimensional tolerances at the housing 1, at the valve seats, the partition plate 10 or the lamina 6 can be compensated by the described assembly as well as the different material properties or bending characteristics of the lamina 6. In order to obtain the defined bias, the axially displaceable air outlet seat 2 or air inlet seat 3 may be pressed on against the electrically biased lamina 6 by applying a predetermined biasing force, or the sealing seats 2, 3 are displaced in the case of a predetermined counter force by the bending lamina 6, so that the two sealing seats 2, 3 reach their final position where they are fixed at the housing 1.

Figure 5:
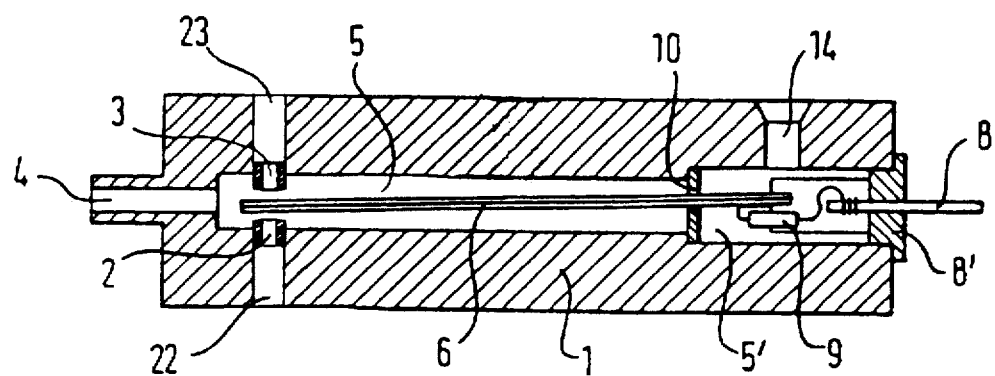
FIG. 5 depicts a third embodiment of the valve.

The embodiment shown in FIG. 5 substantially corresponds to that represented in FIG. 3, the lamina 6, however, in the shown initial position without an applied control voltage not being in contact with any of the two opposite sealing seats 2, 3. In order to nevertheless define the position of the lamina 6 in its initial position without an applied control voltage, the lamina 6 is placed on the sealing seat 2 prior to the pour of a sealing compound and a defined electrical voltage is supplied to the lamina 6. This voltage is selected so that following the solidification of the sealing compound 7 and subsequent to cutting the voltage, a defined distance of the lamina 6 from the air inlet seat 3 or air outlet seat 2 materializes, as shown in FIG. 5. In contrast to the embodiment shown in FIG. 3, the air outlet seat 2 and the air inlet seat 3 are not provided as separate small tubes, but merely corresponding bores 22 and 23 are available in which the elastomer parts, forming the sealing seats 2, 3 for the outlet air or the inlet air, are pressed in.

I claim:

1. A valve having a housing with a valve chamber formed therein, said valve chamber having first and second opposite ends, at least one valve seat formed at the first end of said valve chamber, an elongate piezoelectric lamina having a first end cooperating with said valve seat and a second end embedded in a sealing compound poured into said second end of said valve chamber, and a base carrying a plurality of contact pins, said contact pins having inner ends embedded in said sealing compound and outer ends projecting from said base.

2. A method of producing a valve having a housing with a valve chamber formed therein, said valve chamber having first and second opposite ends, comprising the steps of forming at least one valve seat at the first end of said valve chamber, providing an elongate piezoelectric lamina in said valve chamber, said lamina having a first end for cooperation with said valve seat, mounting said lamina in said valve chamber by embedding a second end thereof in a sealing compound poured into said second end of said valve chamber, allowing said sealing compound to solidify, electrically biasing said piezoelectric lamina, thereby flexing said lamina into contact with said valve seat, shifting said valve seat relative to said lamina until said lamina contacts the valve seat with a predetermined biasing force, and fixing said valve seat on said housing.

3. A method of producing a valve having a housing with a valve chamber formed therein, said valve chamber having first and second opposite ends, comprising the steps of forming at least one valve seat at the first end of said valve chamber, providing an elongate piezoelectric lamina in said valve chamber, said lamina having a first end for cooperation with said valve seat, flexing said lamina and holding said lamina in a flexed condition in contact with said valve seat under a predetermined biasing force, and embedding a second end of said lamina in a sealing compound poured into said second end of said valve chamber while said lamina is in the flexed condition.

4. The method of claim 3 wherein the housing is provided with a hole and a pin is introduced through said hole into contact with said lamina under a predetermined force to shift said lamina into the flexed condition.

5. The method of claim 4 wherein the pin is removed after solidification of said sealing compound, and the hole is closed.

6. The method of claim 5 wherein the hole is closed by pressing a ball into said hole.

* * * * *